United States Patent
Hombs

[11] 3,881,260
[45] May 6, 1975

[54] SELF-TEACHING MACHINE FOR BINARY LOGIC

[76] Inventor: James M. Hombs, 3241 S. 93 East Ave., Tulsa, Okla. 74145

[22] Filed: July 5, 1973

[21] Appl. No.: 376,315

[52] U.S. Cl. .................... 35/30; 35/19 A; 35/48 R
[51] Int. Cl. .......................................... G09b 23/18
[58] Field of Search ............ 35/8 R, 9 R, 9 B, 9 D, 35/19 R, 19 A, 30, 48 R, 48 A, 10, 13; 235/184, 185, 152; 307/207, 215

[56] References Cited
UNITED STATES PATENTS

| | | | |
|---|---|---|---|
| 3,100,352 | 8/1963 | Boissevain | 35/48 R X |
| 3,309,793 | ./1967 | Bartee | 35/10 |
| 3,363,333 | 1/1968 | Alexander | 35/19 A |
| 3,518,440 | 6/1970 | Hanson et al. | 35/48 R X |
| 3,626,608 | 12/1971 | Ingeneri | 35/9 B |
| 3,728,534 | 4/1973 | Isernhagen et al. | 35/30 X |
| 3,731,073 | 5/1973 | Moylan | 307/207 |

Primary Examiner—Robert W. Michell
Assistant Examiner—Vance Y. Hum

[57] ABSTRACT

A self-teaching machine for binary logic wherein means are provided for programming the machine's logic circuits to match a drawing of a logic system.

Typically, the machine has a number of universal logic gates and an interconnecting network. Both the gates and their interconnecting network are programmable providing combinations to represent any one of several million logic drawings.

The machine has the capability of being programmed to match the selected logic drawing by either the student or a preprinted matrix in one corner of the drawing.

The student, after programming the machine with the desired logic drawing, then enters various logic situations via a column of situation selector switches. The machine displays, in relation to the selected drawing, the step-by-step logic flow through the network as a result of logic situations introduced.

This machine is to assist maintenance technicians in becoming familiar with logic flow diagrams of complex mechanical electrical or electronic systems, and also to aid in trouble shooting and checking of particular systems.

14 Claims, 30 Drawing Figures

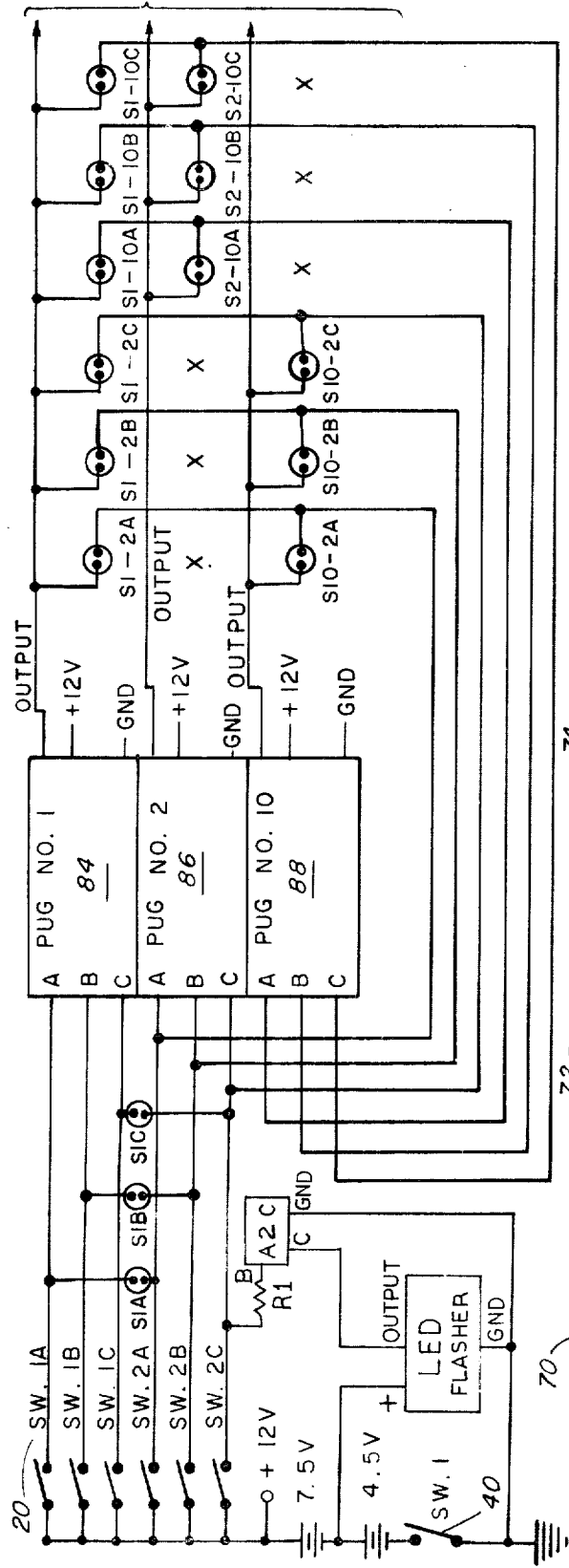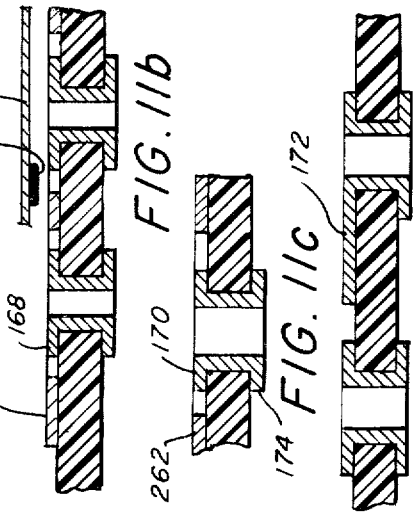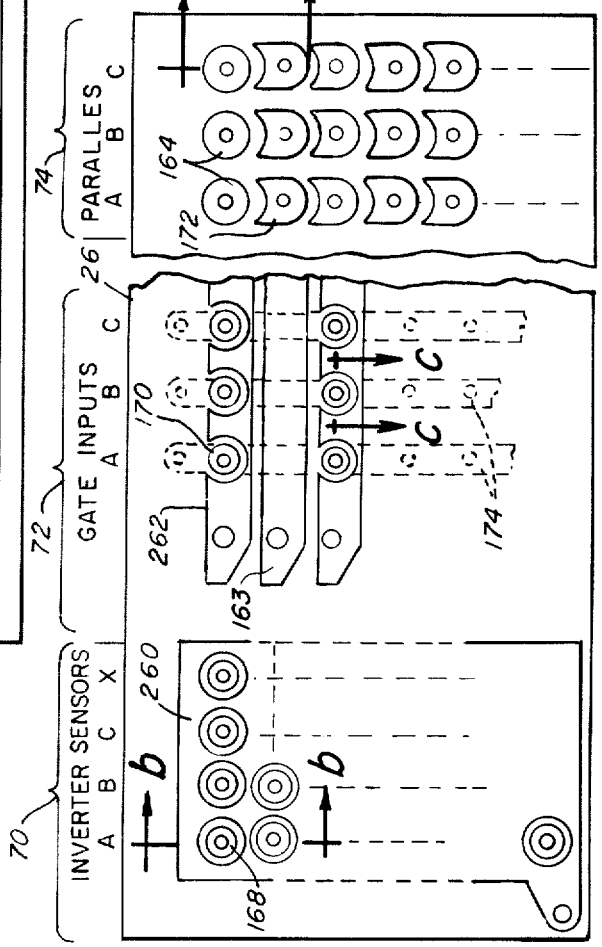

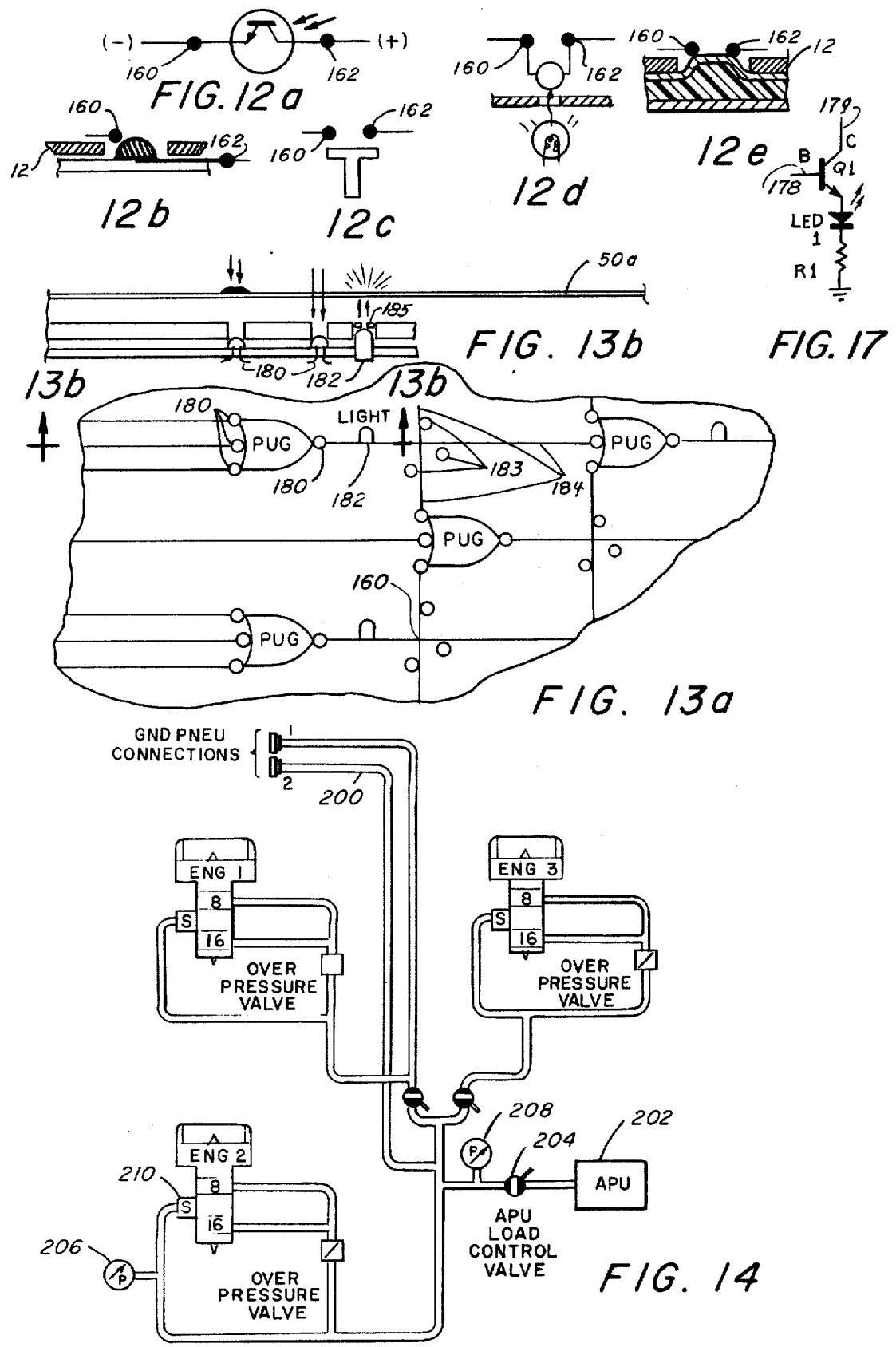

SELF-TEACHING MACHINE FOR BINARY LOGIC

BACKGROUND OF THE INVENTION

This invention is in the field of logic-training devices and includes means for trouble shooting and checking combinational digital logic designs. The combination digital logic, as referred to here, is a logic system having outputs at any instant of time entirely dependent upon the inputs present at that time as opposed to sequential logic systems. Prior art teaching machines deal with instruction of computer logic systems in general. However, there is need for a machine designed specifically for the instruction of the combinational digital logic subsystem of logic systems. This invention is such a machine and it is applied to systems outside of the computer. As mechanical, electrical and electronic systems become increasingly complex they are being expressed in combinational logic-flow diagrams. The basic concepts of this invention are adaptable to general computer training, as prior art is adaptable to special combinational system training. Though this invention is designed for combinational logic applications it has some advantages, as explained by the following, over prior art for basic general computer instruction.

In the prior art there have been shown a number of devices which have been designed in the form of panel boards to which can be attached standard electrical logic gates. These gates were then interconnected by means of patchboard jumper leads which create the desired network. Typical of such panel boards are those manufactured by Digital Equipment Corporation and Digiac Corporation. These systems are very awkward, bulky, expensive, require a large number of each type of logic gate and further require a large amount of operative time to set up and perform the interconnection of the logic elements. Furthermore, because of the maze of wires and leads it becomes very difficult to see at a glance what the logic pattern is and to thoroughly understand what the logic flow diagram comprises. Prior art, consisting of block circuits with related schematic on the face of the blocks, is used with teaching machines that interconnect the blocks without the need for jumpers. The mechanical disadvantages of such arrangements seem to outweigh the advantages. Other prior art, using special schematic cards with associated manually programmable circuits within the machines is expensive and inconvenient. This invention, by taking advantage of a recent type of digital integrated circuit for programming, can conveniently supply a demonstrator drawing in place of patchboard arrangements for either a pre-programmed system or for developing a system.

A prior art teaching machine of interest is disclosed in U.S. Pat. No. 3,363,333, by A. D. Alexander. The machine of that patent operates with a printed schematic diagram on a flexible overlay indicating to the operator the proper switch or switches to be activated in order to operate the machine in a particular preselected one of several different circuit configurations.

However, in the present invention such an overlay card or a paper sheet activates the proper switch directly for particular circuit arrangements, providing automatic programming. The information provided the operator by the relationship of schematic overlay and machine switches is better utilized for introducing various logic situations into the machine, rather than providing manual program instructions.

The A. D. Alexander patent provides means of association between a schematic drawn on an overlay with machine switches by drawing paths to the edge of the overlay to align with particular machine switches. That patent further associates indicators by means of holes in the overlay aligned with machine lamps.

The present invention, on the other hand, improves on the two means of schematic to machine associations by one single means being a "rear-projection process." Rear-projection provides the capability of displaying any desired images to match selected schematics to machine switches and machine indicators. Such means add versatility and greatly simplify both adaptation of schematic to machine by the programmer and the reading of the schematic by the operator.

Another patent of interest is U.S. Pat. No. 3,728,534. This device utilizes the logic block concent associated with schematic drawings and multi-stage universal logic circuits. In applications where it is desired to teach the logic flow of a variety of systems, the programming time is undesirable.

The present invention may represent either a single system utilizing a permanently attached drawing overlay or a variety of system by using easily changed overlays.

SUMMARY OF THE INVENTION

It is the primary objective of this invention to provide an independent machine housing, a programmable interconnecting network of programmable universal gates (PUG) and an array of devices for introducing logic signals into the network. The PUGs are individually programmed for all basic logic gate functions and provide a visual display of their logic output condition. The devices for introducing logic signals into the network are manually operated situation selector switches. Network programming and function programming are accomplished by identical program sensors in a single matrix.

Another objective of the invention is to provide a machine with means to interface its logic flow with that of a logic diagram. That is to say, a machine to display a logic diagram having a special format in such a way as to provide a visual step by step indication of logic flow through the diagram from input to output. It is also an object of this invention to utilize a single sheet of paper for both the logic diagram and the logic programming.

With such a sheet of paper in place on the machine, programming is automatically accomplished for the particular logic drawing on the sheet.

A further objective of the invention is to provide machine programming with standard inks or pencil markings on a conventional sheet of paper. Such a program mark provides photo sensitive control by blocking ambient light through the otherwise translucent paper. Another program means is the use of a standard carbon black ink that is only slightly conductive but may be detected by sensitive field-effect electronic devices such as the Complementary/Metal-Oxide-Semiconductor (C/MOS) integrated circuits used in this invention.

These objects are realized and the limitations of the prior art devices are overcome by this invention in the use of a plurality of PUG. Each of these logic gates comprises a plurality of logic input signals and combines to provide a single logic output signal. Each logic input and output signal includes an inverter which is controlled by a programmable sensor. Each inverter has a logic signal input, a control signal input and a single output; the resulting PUG output energizes an annunciator for visual indication. The PUG just described is applicable by simple programming of the printed sheet to provide the four basic logic functions of AND, OR, NAND, NOR and also in combination with various negated inputs. The PUG is also readily convertible by simple program switching of two of its terminals to become an EXCLUSIVE-OR or EQUIVALENCE logic function.

The action of the controllable inverter is, as the name implies, to invert logic signal voltage when there is a positive controlling voltage applied to the control terminal, and not to invert when there is a zero voltage on this control terminal. The purpose of the sensor is to provide the positive or zero voltage which was provided from a programmable record which is a part of the preprinted problem sheet previously described.

An example of an inverter is an EXCLUSIVE-OR gate with two inputs, one of which is the logic signal input terminal and the other is the inverter control input terminal. The output of the EXCLUSIVE-OR gate is the output of the inverter.

An example of a type of controllable sensor is a pair of terminals of an insulating board, one terminal connected to a positive supply voltage, the other terminal connected to the control input of an inverter. There is a phototransistor connected across the two terminals. The program can be a sheet of translucent material, such as paper, with a spot or spots on the sheet which can be preprinted or blacked in with conductive pencil marking or ink. When this opaque spot is placed over the phototransistor, the resistance is high and in effect creates zero voltage on the control and hence the inverter does not invert. When the opaque spot is removed from the position of the phototransistor, positive supply voltage is then impressed on the control terminal of the inverter and it inverts.

Another example of a conductive sensor is a mechanical pair of terminals, with voltage on one and the other connected to the inverter. A pressure pad serves to connect conductive dots into contact with a pair of terminals.

BRIEF DESCRIPTION OF THE DRAWINGS

FIG. 1b is a front elevational view of the machine of FIG. 1a.

FIG. 1c is a sectional view taken along the line 1c—1c of FIG. 1a.

FIG. 10 is a schematic wiring diagram of the machine of this invention.

FIG. 11a is an enlarged view of a printed circuit board, shown partially cut away, which is used in the training machine as a program reader.

FIGS. 11b, 11c and 11d are partial sectional views taken along the respective lines of FIG. 11a.

FIGS. 12a, 12b, 12c, 12d, 12e represent various forms of programmable sensors.

FIGS. 13a and 13b are other embodiments of the invention depicting the relationship of geometrically arranged programmable sensors utilizing light as an indicating means relative to the problem sheet.

FIG. 14 is a typical pneumatic flow diagram of a system to which the binary logic training machine of this invention can be used.

FIG. 15b is a partial schematic taken from the schematic of FIG. 9 depicting the means to accomplish a six-function PUG with four sensors as shown in FIG. 15a.

FIG. 17 is a schematic of a lamp driver.

DETAILED DESCRIPTION

The Training Machine

Figure 1A:
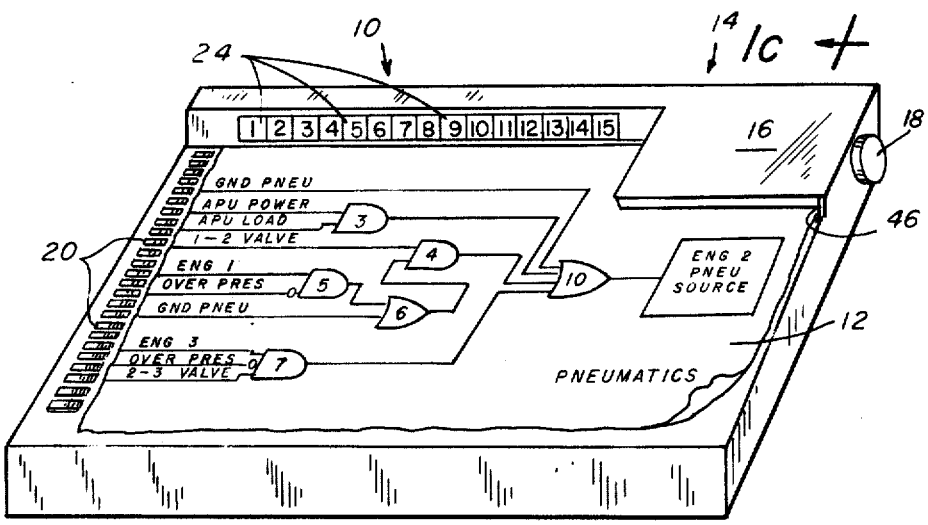
FIG. 1a is a perspective view of a binary logic self-teaching machine of this invention.
Figure 1B:
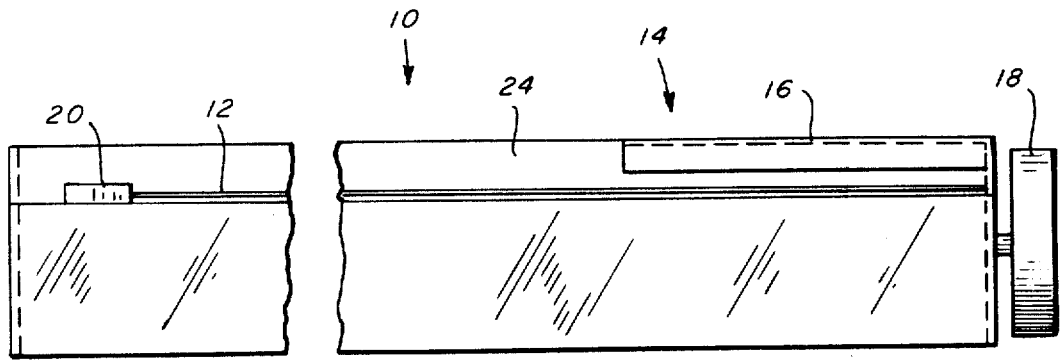

Referring now to FIG. 1, the training machine of this invention is generally indicated by the numeral 10 which is generally an enclosure as hereafter described. The numeral 12 represents a standard size sheet of paper, e.g., 8½ inches by 11 inches, and identical herein as the "problem sheet" upon which is printed a logic diagram and a "program matrix" applicable to that particular diagram and located in this embodiment in the upper right hand corner of the overlay and hidden below the programming section 14 of the machine having a cover 16 (see FIG. 2). Registration of the problem sheet overlay is provided by paper stop 17 and surface 46 of programming section. A programmer knob 18, referred to in FIG. 1a when operated causes the electrical engagement of the program matrix of the problem sheet 12. As hereinafter explained, the program matrix of the problem sheet controls the logic function and connects the logic network.

Along one edge of the machine is located a plurality of identical situation selector switches 20, which in this particular embodiment are 27 in number. Typically, these are slide switches that may, by mechanical or optoelectronic means, reveal an indicating red numeral 1 when moved to a logic "1" or ON condition. These switches represent input to logic gates. At the back of the machine is a row of annunciators 24, shown numbered 1 through 15. The annunciators consist of numbered flags and D'Arsonval meter movements which position the flag representing the associated gate in a window. The window is normally blank, the number flag appearing when the gate is enabled. This arrangement indicates the logic state of a particular logic gate upon the problem sheet 12. That is, when logic gate printed as number 3 has a logic 1 output then 3 of the annunciator 24 will appropriately be displayed. The optoelectronic device that may be used to indicate logic 1 condition for the situation selector switches is a light-emitting diode (LED) which rear-projects the image 1. This indicator, referred to as a lamp annunciator, may be used in addition to or instead of either the mechanical switch indicators or meter type gate indicators.

Figure 1C:
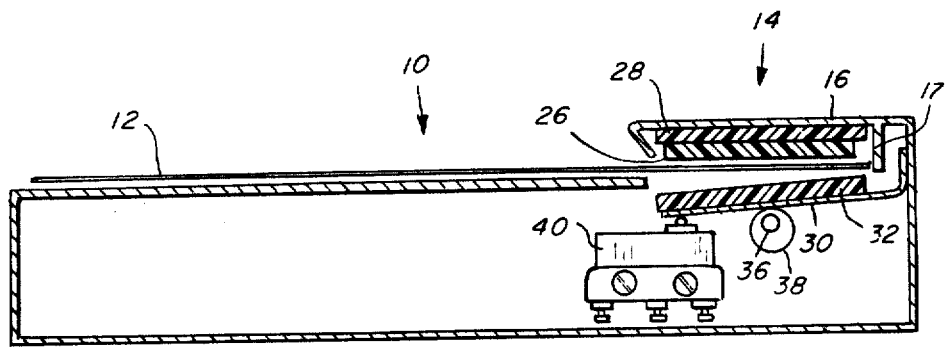

Referring now to FIG. 1c, the programming section 14 includes below the cover 16 a printed circuit board 26 which is more particularly described in FIGS. 11a, 11b, 11c, and 11d. The circuit board 26 is insulatively attached to the cover as shown by suitable insulated material 28. A lever arm 30 includes a sponge-like backing material 32 which is caused to move upwardly, sandwiching the program matrix of the problem sheet 12 to make the appropriate electrical contacts in accordance with the particular logic diagram in use. This movement is caused by the rotation of knob 18 (FIG. 1a) which in turn, via shaft 36, causes cam 38 to move the lever arm 30 upward. Upon the movement of the knob and the cam as above described, the machine is turned on electrically by the closing of switch 40.

THE PROBLEM SHEET

Figure 2:
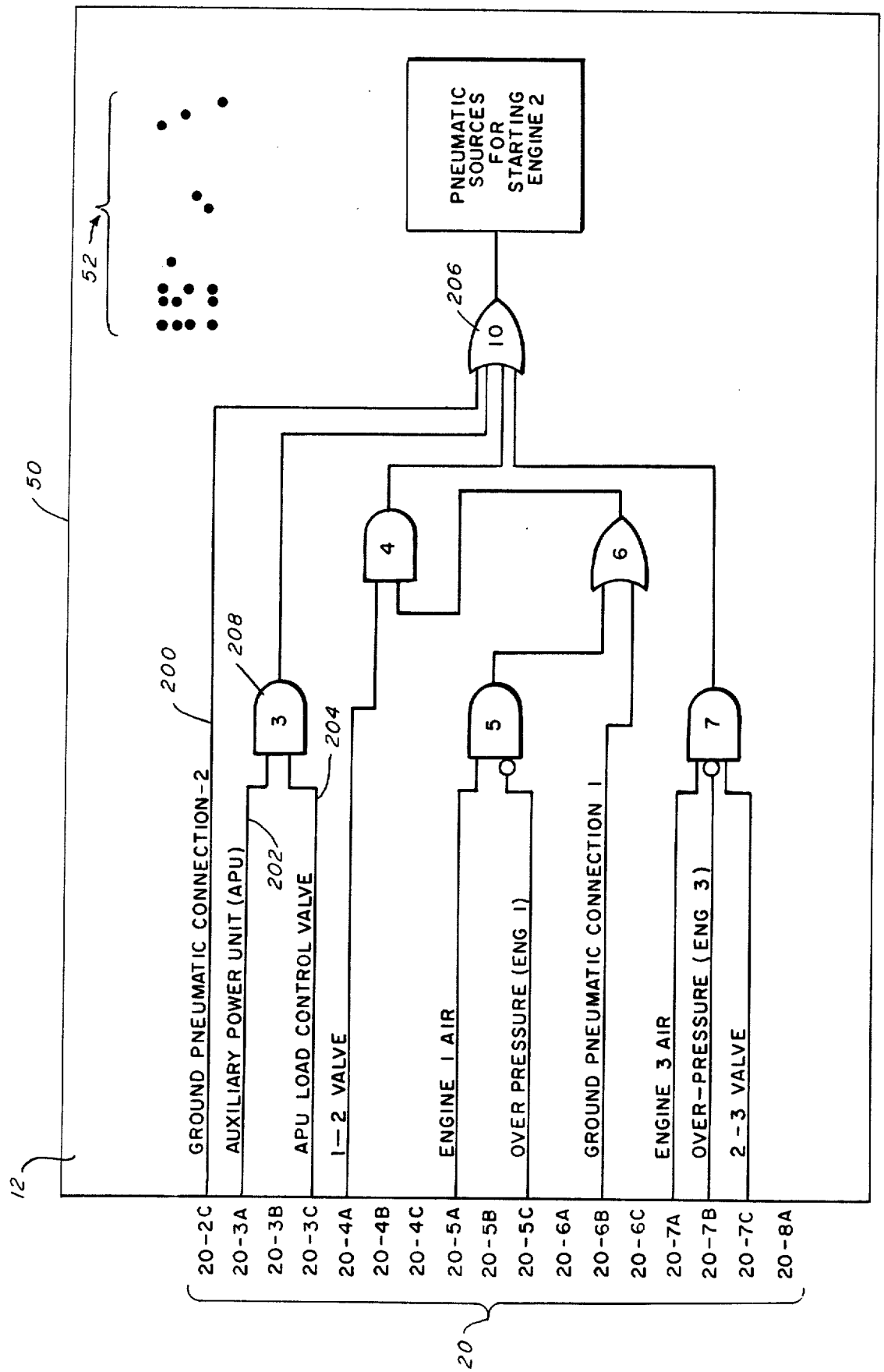
FIG. 2 is a top view of a problem sheet used in the training device of this invention.

A typical problem sheet is shown in FIG. 2 in which a standard sheet of paper 50 has a logic problem preprinted thereon representing the pneumatic flow characteristics of the system as shown in FIG. 14 herein. For descriptive purposes, the corresponding switches 20, shown in FIG. 1a, are identified by the numbers and letters as shown 20-1A, 20-1B, 20-1C, 20-2A, etc. For example, the line "Ground Pneumatic Connection 2" is shown opposite switch 20-2C which then connects with gate 10, switches 20-3A and 20-3C are utilized in conjunction with gate 3, etc. In the upper right hand corner of the sheet would be found the program matrix 52 which in this embodiment utilizes conductive ink dots appropriately positioned and programmed in accordance with the given logic problem sheet. The designations at 3, 4, 5, 6, 7 and 10 on the problem sheet are representative of programmable universal gates (PUG) as hereinafter described, programmed such that 3, 4, 5 and 7 are logic AND gates while 6 and 10 are logic OR gates.

PROBLEM SHEET LAYOUT

Figures 3, 4:
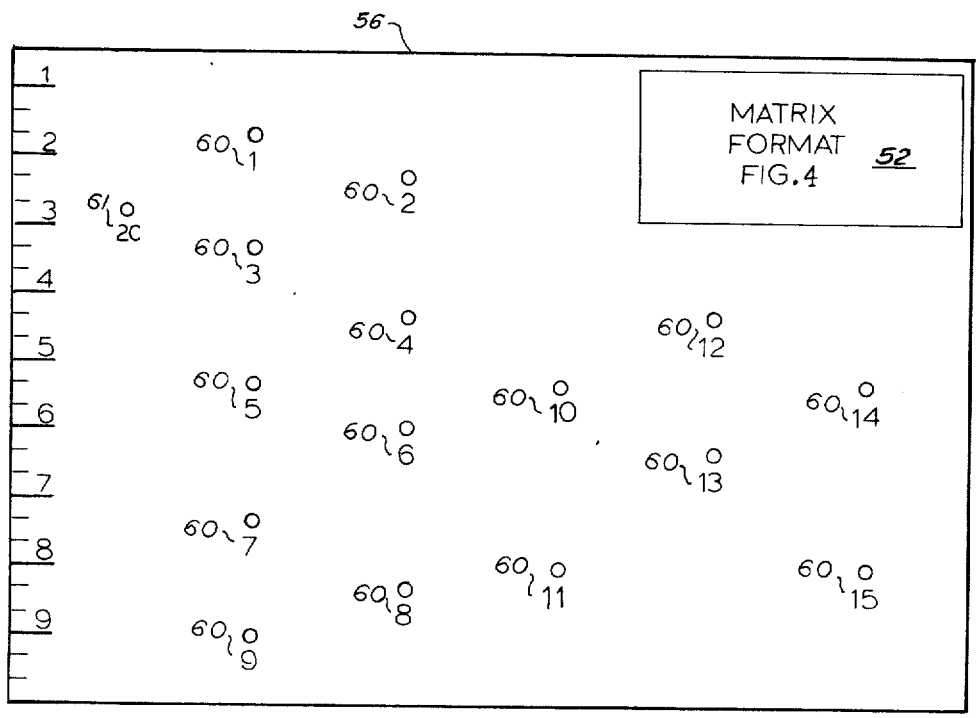
FIG. 3 is a programming format and drawing layout for constructing problem sheets such as shown in FIG. 2.
FIG. 4 is an enlarged matrix format which is typically formed as a part of the drawing layout as shown in FIG. 3.

FIG. 3 represents a drawing format 56 which is utilized in preparing a particular logic problem sheet such as that shown in FIGS. 1 and 2. The format may include a plurality of indicia on the left hand edge which corresponds respectively with the appropriate switches 20 as used on the machine 10 heretofore described. The indicia may be labeled in any manner desired. The program enlarged view of matrix 52 is more particularly described in the enlarged view of FIG. 4 and utilized by program personnel for developing the program and layout of the particular logic problem sheet as placed upon the format. In this embodiment the logic situation input paths, such as 200 and 202 of FIG. 2, are related to the situation selector switches (20 FIG. 1) of the machine by drawing the logic input paths to align with the switches. The positioning of these paths and the marking of the appropriate program matrix dots can be accomplished when the problem sheet is sufficiently transparent by placing the sheet on top of the format. Another embodiment of the invention is shown in the format of FIG. 3 by the layout of the lamp positions 60-1, 60-2, etc. In this instance, the training machines of FIG. 1 may include not only the annunciator flags or lamps 24 thereon but also a duplicate set of lamps 60-1, 60-2, etc. These lamps beneath the top surface of the machine, such as lamp 182 of FIG. 13, would indicate an "ON" condition for a particular gate by rear-projection of the problem sheet and appearing as a red logic 1 on the face of the sheet within the appropriate gate. FIG. 2 is an example of gates drawn in position to be illuminated from behind by the lamp layout of FIG. 3. The lamp annunciator position 61-2C may be used to indicate the "ON" condition of switch 20-2C of FIG. 2.

PROGRAMMING MATRIX LAYOUT

Referring now to FIG. 4, the program matrix grid format will be found on the layout board in the position as shown in FIG. 3. The matrix generally includes three basic sections. Section 70 is identified as a function section for selecting a particular logic function such as AND, OR, NOR, etc., independently for any one of 16 gate arrangements which may be utilized in the training machine.

For example, a 2 input AND gate will be exemplified at gate 3 of the function section by printing or otherwise placing upon a program problem sheet conductive dots in columns A, C and X opposite gate 3 output row. In essence, as explained in a later operation, this conductive material when sandwiched in the programming section of FIG. 1 will connect an inverter with the respective positions of A, C, and X, resulting in the 2 input (A and C) AND function.

Section 72 indicates the matrix area for interconnecting various gate inputs and outputs. Gate 7 is an AND gate which connects directly to OR gate 10 by a conductive dot positioned at the intersection of its output row (gate 7 output row) and that of C input column of gate 10 (gate 10 input C column).

Figure 15A:
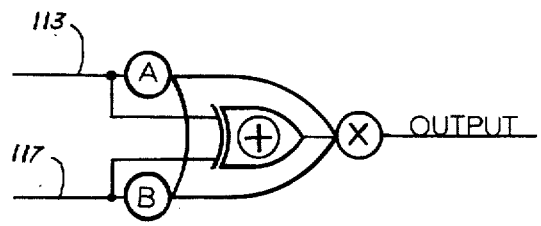
FIG. 15a represents, in logic symbology, a six function PUG utilizing four sensors.

Section 74 indicates parallel matrix section, the purpose of which is to provide means for interconnecting the situation selector switches 20. For example, a conductive mark is shown connecting switches 3B, 4B and 5B. The section indicated by brackets 76 is an additional embodiment of the invention matrix describing means for creating within the training machine EXCLUSIVE OR or EQUIVALENCE. This embodiment is the first of three EXCLUSIVE OR embodiments and will be referred to as such. The second EXCLUSIVE OR embodiment is described in FIGS. 7 and 8a. A third embodiment is shown in FIGS. 15a and b. The three EXCLUSIVE OR embodiments are capable of functioning as either an EXCLUSIVE OR ($\oplus$) or its complement an EQUIVALENCE ( ■ ). The first EXCLUSIVE OR embodiment applies to PUG's 10 through 15. An example of programming the first EXCLUSIVE OR embodiment is a conductive dot positioned within the column noted as $\oplus$ opposite row 12 will provide an EXCLUSIVE OR gate. Similarly, in the same column opposite row 14 is another EXCLUSIVE OR gate. However, in the latter case, by referring to Section 70, a conductive dot positioned within row 14 of column X provides a complement of gate 14 with a resulting EQUIVALENCE function. The column marked + indicates a PUG OR gate. PUG OR refers to matrix section 70 where the PUG functions are limited to an OR with inverters. In all cases where a gate is not an EXCLUSIVE OR, it must be made PUG-OR gate, as shown by the conductive dots in gates 10, 11, 13 and 15 in Section 76. Circuitry is described in FIG. 9. The intersection of columns and rows in Section 72 that are marked with an "X" are merely described herein to indicate where an output gate is the same as its input and therefore no means for connection provided therein. Accordingly, it can be seen that the matrix is a means by which the problem sheet can be programmed to fit a particular situation upon that sheet and provides flexibility to the interconnection of various types of logic gates and the function of the gate.

LOGIC SIGNAL PATHS

Figures 5, 6:
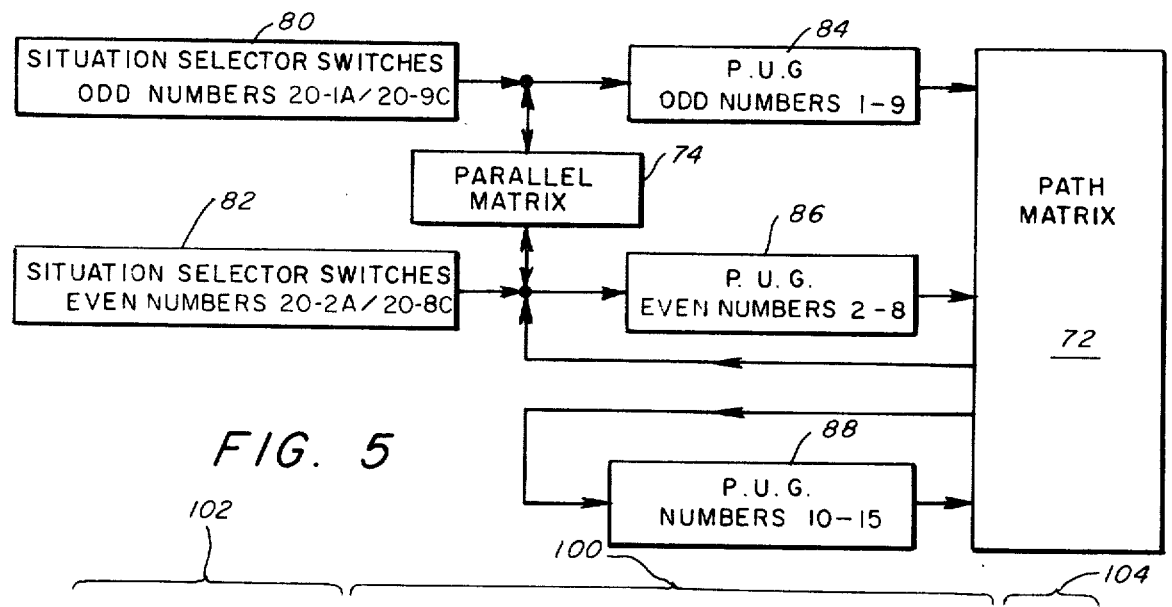
FIG. 5 is a block diagram of the signal paths typically used in the machine of this invention.
FIG. 6 illustrates the comparison of standard logic symbology with programmable universal gate symbols as referred to in this invention.

FIG. 5 is a block diagram of the signal derived from the wiring schematic of FIG. 10. FIG. 5, along with FIGS. 3, 4, and 6, comprise the complete set of programmed reference material. No additional information or special knowledge is needed to adapt a logic drawing to the machine. FIG. 5, block 80 represents the odd number situation selector switches 20–1A through 20–9C. Likewise, block 82 is representative of the even numbers as shown. As shown, these switches may be interconnected to the parallel matrix section 74 as previously described in FIG. 4. The various PUGs have their input and output logic signals connected by incoming and outgoing arrows of blocks 84, 86 and 88. The arrows represent signal paths made available by programming Section 72 and Section 74 of the matrix FIG. 4. Logic function is obtained within each individual PUG block using Section 70 of FIG. 4 and is not shown in FIG. 5. All PUGs are fed directly into, and directly or indirectly out of, the path matrix 72.

FIG. 6 is a diagram to show a comparison between standard logic symbology symbols 100 and the programmable universal gate (PUG) 102 which can be created within the device and methods of this invention. Additionally, the apparatus of this invention may be programmed comparatively to the use of truth tables such as that shown in Section 104 of FIG. 6.

As shown, the apparatus of the invention is also useful with Boolean equations. The PUG is represented herein by the same symbol as an OR gate with inverters shown by the small circles 106 on all terminals. The PUG symbol departs from standard logic symbology when the circles for the inverters are filled in as shown. The solid black circle in this instance is equivalent to the conductive ink sensor. The solid circle is indicative of a connection with an inverter at the particular point of the logic function. This special symbology of a PUG also provides an indication of an available inverter and if it is functional as an inverter. The embodiment of the PUG shown in FIG. 6 uses three inputs, A, B, and C, whereas only two are shown in this view. As such, the chart would then be expanded to show 16 logic functions available instead of 8 as shown. The PUG symbol, as used herein, effectively represents the machine's logic circuitry and provides a convenient programming aid for program personnel. Hence, programmers only need to recognize that inverters are available at all terminals of an OR gate and made operative by filling in the circles.

PUG

Figure 7:
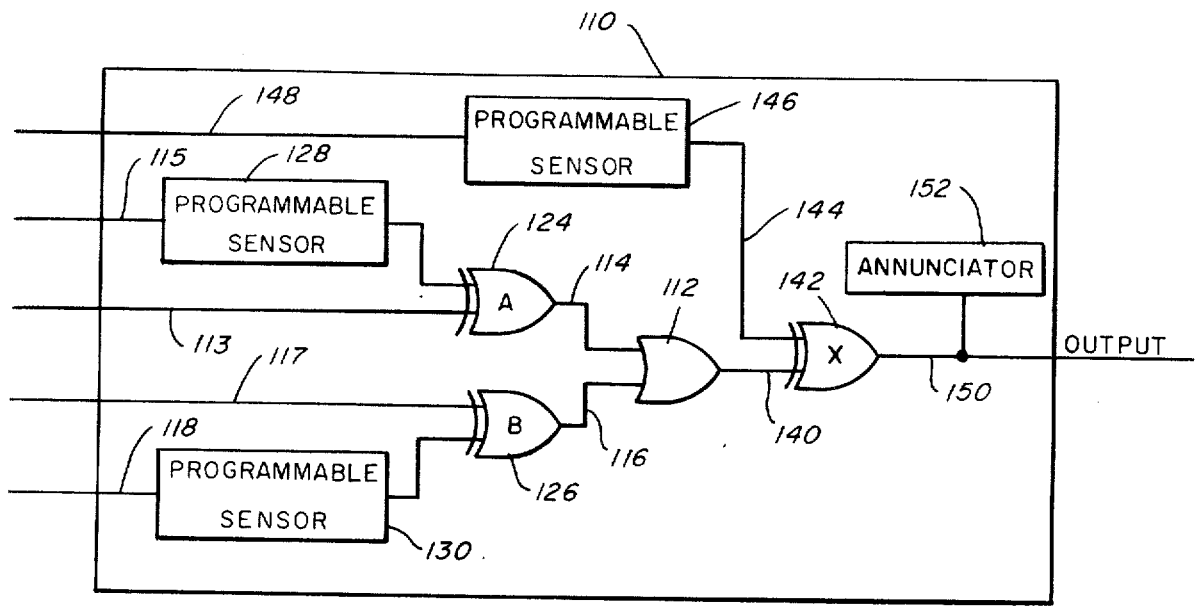
FIG. 7 is a logic function diagram of the programmable universal gate (PUG) of this invention.

FIG. 7 is a block diagram of a PUG of this invention and includes all of that proportion indicated within the larger block 110. The A, B, and X labels of 124, 126 and 142 relate to the controllable inverter inputs and output of the PUG symbols of FIGS. 4 and 6 when the PUG is used as an AND, OR, NAND, and NOR function. When the PUG is used for the two additional logic functions, to-wit, EXCLUSIVE OR and EQUIVALENCE, only the X output inverter is applicable. The heart of the PUG is the OR function indicated by the logic symbol 112. Programmed inputs 114 and 116 are each a result of the programmed inversion or non-inversion of respective logic input signals A and B on leads 113 and 117 to respective controllable inverters 124 and 126. The inverters are controlled by the respective programmable sensors 128 and 130. When the PUG is to become one of the four basic logic functions, to-wit, AND, NAND, OR or NOR, inputs 115 and 118 are both used to furnish positive supply voltage to be controlled via respective sensors 128 and 130. When the PUG is to become either an EXCLUSIVE OR or EQUIVALENCE, inputs 113 and 115 will be connected to provide the logic signal inputs A and B directly to EXCLUSIVE OR 124, as, for example, by closing sensor switch 128 and externally switching logic signal B from lead 117 to lead 115. The resultant logic signal 140 from the OR function symbol 112 is connected to a controllable inverter 142, operating as the "X" inverter for all six functions. The control signal 144 causes inverter 142 to either invert or not invert, depending upon the switching of the programmable sensor 146 from a 12 volt supply via line 148. The resultant output 150 has an annunciator 152 providing a visual indication to the user of logic 1 or logic 0. It is understood, an important feature of this invention is such that the PUG shown in FIG. 7, by various arrangements of the input and control voltage connections 113, 115, 117, 118 and 148, all six logic functions at the output are provided.

Figure 8A:
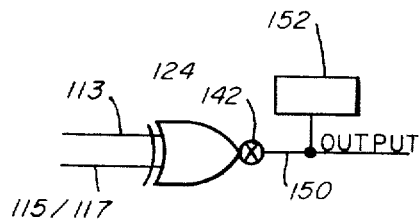
FIG. 8a is a simplified logic diagram of a PUG when acting as an EXCLUSIVE OR or EQUIVALENCE.

FIG. 8a is the resultant logic function of the PUG with leads connected for EXCLUSIVE OR and EQUIVALENCE operation as described in FIG. 7, with like numerals indicated like parts. This utilization of the PUG for the two additional functions is the second EXCLUSIVE OR embodiment. The first EXCLUSIVE OR embodiment referred to in the description of FIG. 4 is switched into operation internally of the PUG, whereas the second embodiment is switched externally. FIG. 8a represents three embodiments with B input for the second embodiment using terminal 115 and first and third embodiments using terminal 117. The third embodiment is described in FIGS. 15a and 15b.

Figure 8B:
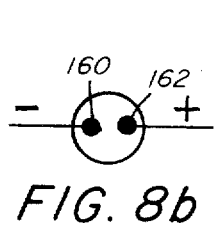
FIG. 8b is a schamtic of a typical sensor as shown in FIG. 7.

FIG. 8b represents a typical programmable sensor such as 128, 130 or 146 of FIG. 7. Basically, the sensor comprises two terminals, a negative terminal 160 and a positive terminal 162 with appropriate leads therefrom. The polarity symbols being used herein for reference are in the embodiments of FIG. 12.

Figure 8C:
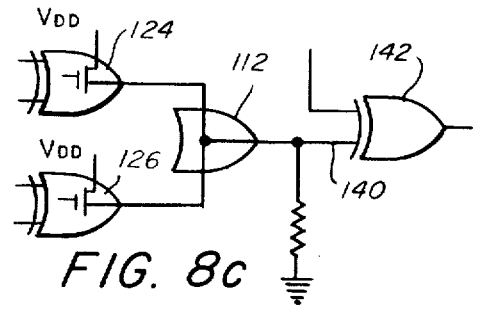
FIG. 8c is an alternate means to obtain an OR function for gate 112 of FIG. 7.

FIG. 8c is a schematic circuit of metal oxide semiconductor (MOS) devices 124 and 126 representative of their logic function symbols of FIG. 7. The MOS devices are operated to obtain an OR function at 140 as indicated by 112 of FIG. 7.

In this embodiment, 112 is what is termed a Wired-OR and is obtained by connecting the MOS open source devices 124 and 126. The open source devices are capable of providing only a logic 1 output or an open circuit. The current sink or logic 0 for the OR function of 112 is through the relatively high impedance path of the pull-down resistance as shown.

Figure 9:
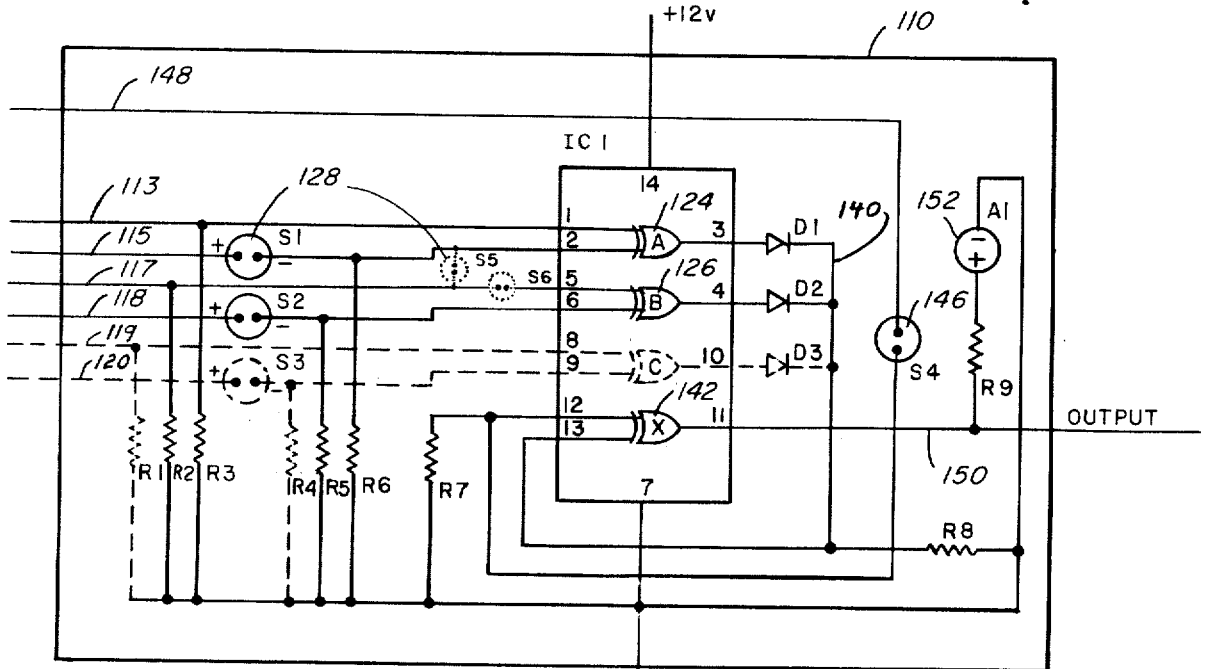
FIG. 9 is a schematic circuit diagram of the PUG diagram of FIG. 7.

FIG. 9 is the PUG schematic, having like numerals given to like parts of FIG. 7. FIG. 9 represents a still further logic device, when a logic device provides both current sink and source such as IC1 (Integrated Circuit 1) Motorola C/MOS Model MC 14507. Isolation devices (diodes) D1 and D2 are used to obtain an OR function at signal point 140.

Resistors 1 through 8 are pull-down resistors while R9 is a current-limiting resistor. A1 is the annunciator of the M type as hereinbefore described. The meter type annunciator has full scale deflection at 500 micro amperes and may be driven directly by the IC as shown. Additional circuitry for a lamp type annunciator is shown in FIG. 12f.

Although the PUG, as heretofore described in FIG. 7, is represented as having two gates, it is to be understood that additional gates may be added with input paths, such as 119 and 120 to the system, as represented by the dashed line of FIG. 9 when using the four basic functions. The additional sensors 128, S5 and S6 are shown dotted for that first EXCLUSIVE OR embodiment. With the PUG limited to four functions these two sensors are omitted, having S5 connecting points of the PUG circuitry open and S6 connecting points closed.

Figure 15B:
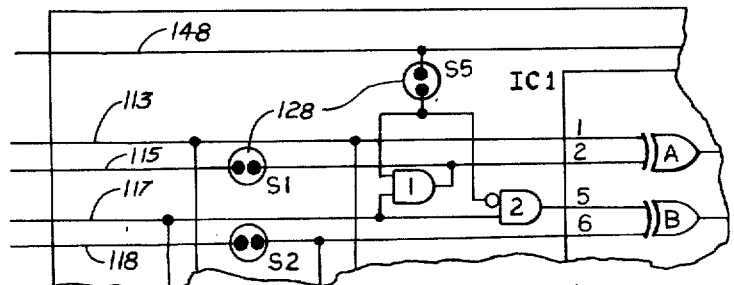

For the first EXCLUSIVE OR embodiment, S5 and S6 provide internal switching of terminal 117 (B input signal of PUG). With S5 conductive and S6 nonconductive, the PUG inputs A and B function as an EXCLUSIVE OR of FIG. 8a. With S5 non-conductive and S6 conductive, the PUG functions as an AND, NAND, OR or NOR. These sensors are shown arranged in section 76 of FIG. 4. FIGS. 15a and 15b, though out of sequence, are best described here as modifications of FIG. 9. FIG. 15a reduces the number of sensors necessary for internal switching of the PUG to an EXCLUSIVE OR function. FIG. 9, S6 is replaced with AND gate 1 and AND gate 2 of FIG. 15a. FIG. 15a AND gate 2 sensor input is negated so as to inhibit signal on lead 117 to IC1 pin 5 at the time AND gate 1 sensor input is positive and allowing AND gate 1 to be enabled by a logic 1 signal on 117.

FIG. 15a is the modified PUG symbol providing a programming aid for all six logic functions to be used with the circuitry of FIG. 15b. The inverter symbols A, B and X having identical functions to the PUG of FIG. 6, the additional EXCLUSIVE OR circle ( $\oplus$ ) is printed solid when conduction of S5 is desired as hereinbefore described for symbols A, B and X.

MACHINE SCHEMATIC

FIG. 10 represents a complete schematic diagram showing power and signal flow which would be incorporated in the self-teaching machine of this invention. The schematic proprotions previously explained in FIG. 9 are shown as PUG blocks 84, 86 and 88. SW1 is a snap action switch 40 (FIG. 1c) and is adapted to energize the system in which the power supply may be either a single 12 volt battery, when only meter type annunciators are used, or a 4.5 volt and 7.5 volt battery as shown for lamp type annunciator operation.

Switches 20 will correspondingly provide signal voltage via the designated SW.1A, 1B, etc. to the respective PUG. Switch 20–2C operates annunciator A2C. The annunciator position is shown as 61–2C of the format described in FIG. 3. By using one or more annunciators such as A2C, one or more situation selector switches need not be aligned with the problem sheet. The annunciator has its B terminal connected to switch 2C via base current limiting resistor R1 and its C (collector) terminal connected to the output of the LED flasher. This lamp annunciator is described in more detail in FIGS. 17 and 13b. The LED flasher supplies a 1 hz 0 to 4 volt square wave at its output providing collector current for a plurality of LED type lamp annunciators. The flashing logic 1 display is for easy recognition and conservation of battery power.

FIG. 11a depicts a partially printed circuit board 26 of a photo-etched type as shown for use in the self-teaching machine of this invention in FIG. 1c. The board comprises an insulating material with copper clad areas 160, 162, 164, 168, 170 and 172, on the top face surfaces of the board. The cladding pattern differs for the top face surface and the bottom back surface as shown. The face of the board contacts the program, the back having the lead connections. The board is typically one in which holes have been placed in an exact grid and the board is then etched in a selected manner to provide conductive areas on both surfaces of the board. All holes are Plated-through holes such as 168, 170 and 172 so that there is a connection made between the top and the bottom or surfaces of the board 26. The purpose of the board and the layout of the conductive areas on both surfaces is such that on the face there will be provided pairs of terminals positioned in precisely selected areas of the board that correspond to the respective sensors, such as S1A, S1B, S1C, S1–2A, S1–2B, etc., as shown in FIG. 10 and would also include those sensors shown in the PUG of FIG. 9. The location of the conductive areas and openings coincides with that shown in the matrix layout description of FIG. 4. The conductive dots, such as those shown at 52 in FIG. 2, are preprogrammed upon the problem sheet 50 and because the dots shown are of a conductive nature, the appropriate sensors will be made conductive in accordance with the program for particular logic display. The conductive dot may be either a conventional graphite material or common, carbon black ink which may be directly applied by a user or may be printed. Typical of such ink is the slightly conductive carbon black ink manufactured by Sinclair and Valentine of Dayton, Ohio, identified as 42902. There are several functions that are provided by the programming of the problem sheet in conjunction with the circuit board 26. One is to control the sensors that have been previously described which are in turn connected to inverters. The other is to provide connection between PUG as for example by the paralleling connections S1A, S1B, etc. While the circuit board as shown in FIG. 11 is only one of many possible arrangements of terminals for the purpose of carrying out these programmed operations, there are many combinations that can be used to control the self-teaching machine of this invention.

A representative usage operation of the programmed problem sheet is shown in FIG. 11b, wherein the problem sheet 50, shown enlarged, has included thereon a conductive dot 52, which when utilized in the machine of FIG. 1 will be pressed into conductive relationship with the copper clad 260 (positive supply voltage) and the ring portion of Plated-through hole 168, hence close a selected sensor. As shown in FIG. 11a in the gate input section 72, the conductive bars 262 represent gate outputs and are connected to the gate inputs via the vertical bars 174 shown in dotted line as being on the back side of the board. A sensor circuit is closed by a conductive dot contacting the horizontal bar 262 and the ring portion of the Plated-through hole 170, which connects with the vertical conductive cladding 174. The lack of terminals at the intersection of the horizontal strip 163 on the face and that of the vertical strips 174 on the back match the X marked intersections of gate 2 input and output of FIG. 4. Connections in the parallel section 74 are made between adjacent pads in a vertical column as shown in FIG. 11d.

The views of FIG. 12 represent various forms of sensors as used in this invention. Like numerals are given to like parts as used herein. The embodiment of FIG. 12a represents another embodiment of this invention which is more specifically described and shown herein in FIG. 13 wherein the conductivity of the sensor is controlled by light, as for example, a phototransistor utilizing ambient light as shown in FIG. 12a. FIG. 12d shows a machine-provided light for a photosensitive sensor. These photosensitive sensors may be arranged within the matrix pattern, as for example, on a printed circuit board positionable within the teaching machine and made operable or inoperable (i.e., conductive or non-conductive) by translucent or open or opaque matching program areas on the problem sheet. FIG. 12b shows sensor contacts arranged on each side of the problem sheet allowed to make connection through perforations in the sheet. FIG. 12c is a manual push button switch contact. FIG. 12e shows sensor contacts being connected by either a resilient conductive layer forced through the perforations or a conductive pressure pad such as carbonurethane sponge.

FIG. 13a is a problem sheet, shown partially, or may be representative of the top of a self-teaching machine such as shown in FIG. 1. The PUGs as shown are programmed, in this embodiment, by the passage or the nonpassage of light, the cross section of which is shown in FIG. 13b. For example, a phototransistor (FIG. 12a) as sensor for programming logic gate function would be appropriately located in the self-teaching machine at positions 180. For network switching, phototransistors (FIG. 12a) would be located so as to receive controlled light through circles 183. The phototransistors having their leads 160 (FIG. 12a) common at point 160 of FIG. 13a blocking the light through a circle then blocks the respective path 184 adjacent to the circle, providing each PUG with a choice of three output paths. When the problem sheet represented as 50a is placed in the machine and by the provision of a translucent means or opening opposite the particular phototransistor will make the appropriate sensor connection. When a particular PUG is thus energized or enabled, then a light such as shown at 182 will be energized and thus be indicated on the face of the problem sheet 50a to the observer.

FIG. 13b shows 182 used for rear-projection in this embodiment and the lamp annunicators as hereinbefore generally described. A mask 185 and lamp 182 project a logic 1 on the face of the problem sheet. Another masking method allows a problem sheet to have an image appear in red lighting on its face by the printing of the necessary image mask on the back of the sheet to align with a projected red light spot.

FIG. 17 is a schematic of a lamp driver used for light emitting diode (LED) type annunicators. The LEDs hereinbefore described may be connected in place of, or in addition to, annunciator 152 of FIG. 9 and is the circuitry for the annunciator block A2C of FIG. 10. The LEDs are made operative when connecting Q1 base lead 178 to a suitable positive voltage and collector lead 179 connected to the LED flasher output shown in FIG. 10. Resistor R1 is an emitter current-limiting resistor, Q1 is a darlington amplifier and the LED is a General Electric SSL 212.

The PUG electronics may be located anywhere in the enclosure of the machine 10 in any well known packaging manner (not shown) so long as the functional sensors 180 are positioned substantially as indicated in FIG. 13A and so long as the function sensors 70 are positioned on the board 26 as shown in FIG. 11A.

OPERATION

The first operational procedure to be taken with the teaching machine is the programming operation. This presupposes that a teaching machine such as shown in FIGS. 1a, b, c, has been prewired, as for example in accordance with FIGS. 9 and 10 and includes the printed circuit board 26 which is described in greater detail in FIG. 11. In the preparation of the problem sheet, the procedure may comprise a simple alternation of an already existing drawing which does not need to be standard logic gate symbols, such as shown in FIG. 14. For example, identify logic inputs to the machine's situation selector switches, such as "Ground Pneumatic Connection 2" is labeled to switch 20-2C and pressure gauge 208 labeled to gate 3. Another method includes the redrawing of a diagram such as FIG. 14 to match the machine such as the layout of FIG. 2 and positioned in the machine as FIG. 1a. The problem sheet would be completed with the preparation, in one embodiment, of the program matrix area 52 of FIG. 2. To accomplish this, personnel programming the machine can utilize the matrix layout which is shown in FIG. 4 and thus program the machine to the behavior of the logic problem sheet.

The operation described herein uses two extremes of symbology in order that the operation encompass the maximum adaption which is believed to be necessary. FIG. 14 is a functional diagram of pneumatic system shown in a typical engineering diagram and very remote from a logic flow diagram using standard binary logic gate symbols. The utilization of such logic gate sytems becomes a more convenient visual means to train engineers, maintenance personnel or others as to the actual operation of the system, its requirements, safety features, etc., in a more convenient manner over the actual system diagram such as found in FIG. 14.

The problem sheet using standard logic symbology is shown in FIG. 2 and corresponds to the logic sequence of the pneumatic system of FIG. 14.

The pneumatic to logic gate conversion is a common practice as a means of system-function description for analysis and maintenance purposes.

The logic input lines are aligned with the situation selector switches 20 and connected to gates which are numbered (i.e., 3, 4, 5, 7, 10) to match the proper gate annunciators 24. In preparing the drawings, such as shown in FIG. 2, the master layout of FIG. 3 can be used as an aid so that the resultant drawing will align itself with the switches 20. As previously explained, the "Ground Pneumatic Connection — 2" of FIG. 2 is thus aligned with the manual switch 20–2C. The other titles representing the mechanism of FIG. 14 are layed out to match with the particular switches 20 of the teaching machine. The numbered gates, as printed on FIG. 2, represent the possible availability of pneumatic pressure as reflected in FIG. 14.

The matching continues with "Ground Pneumatic Connection — 2" path 200 of FIG. 2 aligned with switch 20–2C and "APU" 202 aligned with switch 20-3A, etc.

The gates in FIG. 2, such as 206 and 208, represent the possible availability of pneumatic pressure as reflected in the system construction. These gates with their input connections and output annunciators are shown by corresponding pneumatic connections of their pressure gauges in FIG. 14. Whether the pneumatic pressure is actually present or not depends on the logic situation of the gates. The one switch that can directly supply air to the engine 2's starter 210 is path 200 in both figures.

In preparing the problem sheet it must now be programmed, which in this embodiment is the utilization of conductive dots in area 52 of the problem sheet shown in FIG. 2.

The function programming of the individual logic gates, such as 206 and 208, is accomplished using the function matrix 70 of FIG. 4 and its interface symbol PUG as shown. In this particular system, an OR function of gate 2 is desired. Hence, as shown in FIG. 4 in section 70 thereof, all four inverters, to-wit, A, B, C and X, are left open, giving an OR function as verified by FIG. 6. The particular PUG function is then programmed for each of the gates as shown in FIG. 2. Gate 2 is not shown in the problem sheet of FIG. 2 but is merely utilized and programmed within the machine to obtain a fourth input for OR gate 206. Additional example is for gate 208 which is an AND gate, as symbolized in FIG. 6, and therefore conductive dots are positioned for gate 3 as shown in FIG. 4 in columns A, C and X.

Programming of interconnections within the machine is accomplished, while referring to the matrix of FIG. 4, in the "path" section 72. The system, which has been described in FIG. 2 heretofore, requires that gate 2, not shown, have one of its inputs connects to a switch 20–2C and another input from the output of gate 3 (208). Input A or B can be used, however, A is used in this instance and connected by placing a conductive dot in column 2A opposite output gate 3, i.e., the intersection of gate 2 input A column and gate 3 output row. The output of gate 2 is then connected in a like manner to the A input of gate 10 (206) via dot placed in column 10A opposite output gate 2. The dot pattern essentially shown in the matrix layout of FIG. 4 and then duplicated in the problem sheet of FIG. 2 in area 52 is the complete programming pattern for the logic drawing of FIG. 2. In the particular instance heretofore described gate 2 is a hidden gate. The rest of the gate connections, as shown, will match the conductive dots as shown in FIG. 4. Although the particular problem sheet of FIG. 4 did not require any parallel interconnections between selector switches 20, this may be necessary in other logic circuit diagrams and therefore section 74 of FIG. 4 is the means by which such parallel switching may be accomplished. This can be done, for example, by supplying conductive dots or bars or the like, as shown in FIG. 4 for such parallel interconnection.

When the problem sheet has been properly prepared and programmed as shown, and is placed within the teaching machine of this invention, the operator will turn knob 18 providing a connection to the printed circuit board 26 and thus provide energization of the machine. The conductive dots then provide connections, such as diagrammatically shown in FIG. 11, to properly program the machine. When the student operates situation selector switches 20–3A and 20–3C to provide a logic 1 condition to paths 202 and 204, this enables gate 208 and thus the numeral 3 will appear in the annunciator section 24. Thus, this will show to the student the fact that the auxiliary power unit (APU) and APU load control valve are both necessary to enable gate 208. Because gate 206 is an OR gate, any logic 1 appearing at an input will provide an output indication signifying the availability of a pneumatic source suitable for starting engine 2.

SEQUENTIAL LOGIC EMBODIMENT

Figure 16:
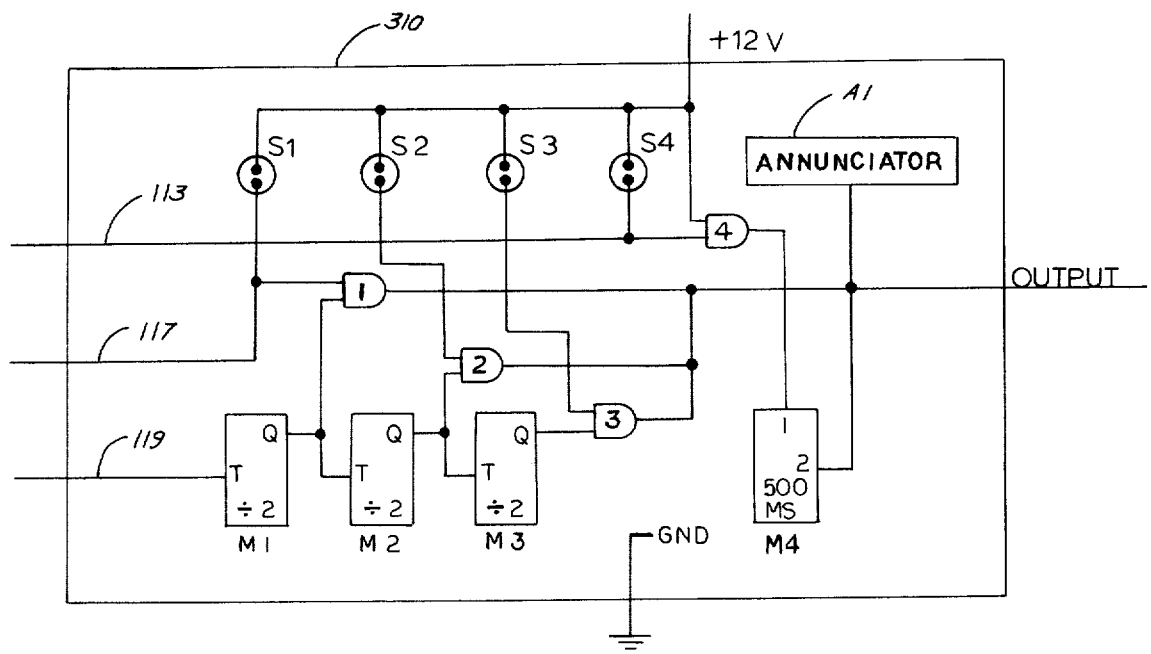
FIG. 16 is a block diagram of a sequential logic embodiment of this invention.

FIG. 16 is a Programmable Universal Multivibrator (PUM). Two of the PUM circuit blocks 310 replace two of the PUG circuit blocks 4 and 8 of 86 FIG. 5 (signal block diagram). The PUM block 310 is wired into the machine by replacing the respective leads of PUG block 110. As an example, PUM leads 113, 117, 119, and 12, OUTPUT and GROUND in place of like PUG leads with lead connections 148, 113, 118 and 120 not used for PUM. FIG. 16 sensors S1, S2, S3, and S4 are the respective A, B, C and X columns of 70 FIG. 4. The sensors serve as function control as like sensors of the PUG. The PUG symbol for sensor control 70 FIG. 4 does not apply, rather PUM S1, S2, and S3 control respective AND gates 1, 2, 3, M1, M2, M3, and count 2, 4 and 8. An example using M2 (one of the three multivibrators which are master slave flip flops) divides input signal 119 a second time after it is divided by 2 within M1 furnishing a ÷ 4 signal at its Q terinal. The ÷ 4 signal is then switched to the PUM output lead via AND gate 2 when S2 is made conductive. M4 is an astable 500 millisecond multivibrator supplying clock pulses at its output terminal 2 when its control terminal 1 receives a positive voltage via AND gate 4. Gate 4 is enabled by either a program dot at S4 or a manually introduced logic 1 condition at 113 via an appropriate situation selector switch and the associated interconnecting network. Gate 1 is enabled in the same manner by S1 and lead 117. A1 is a lamp annunciator as hereinbefore described.

It is to be understood that this invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

What is claimed is:

1. An independent machine for teaching binary logic utilizing a printed problem sheet having a plurality of illustrated logic gates, input and output signal paths printed thereon, said machine comprising:

a. a plurality of programmable universal gates (PUG), each PUG having at least two input terminals and one output terminal,
b. annunciator means for at least one of said PUG,
c. a plurality of manually operated situation selector switches to provide logic signals to the said PUGS,
d. a means to position said problem sheet to match a plurality of said situation selector switches with said plurality of illustrated logic input signal paths printed on said problem sheet
e. a programmable sensor means to selectively interconnect the output terminal of at least one said PUG to at least one input terminal of any second PUG and
f. said programmable sensor means comprising switching means carried by the machine and operably connected to the terminals of the PUG, operator means for said switching means carried by the said problem sheet and engagable with said switching means.

2. The machine of claim 1 wherein a PUG comprises:
a. an OR gate function,
b. a plurality of controllable inverter processed logic input signals to said OR gate function,
c. a controllable inverter processed logic output signal of said OR gate function,
d. programmable means to control said inverters, and
e. said annunciator means to indicate logic output condition of said controllable inverter processed logic output signal of said OR gate function.

3. A machine of claim 2 wherein said controllable inverter is an exclusive OR gate.

4. A machine of claim 2 wherein said annunciator is a visual display.

5. A machine of claim 2 wherein said switching means comprises a photosensitive switch, ambient light source means for energizing said switch and wherein said printed problem sheet is of a translucent material and said operator means carried by said problem sheet comprises selective opaque portions for blocking said ambient light source means from the photosensitive switch.

6. A machine of claim 2 wherein said programmable means to control said inverters comprises a photosensitive switch and ambient light source means operably connected to each said inverter, said switch being exposed to ambient light and energized thereby and wherein said printed problem sheet is of translucent material and having opaque portions thereof for selectively blocking the ambient light from the said photosensitive switch.

7. A machine of claim 2 wherein said programmable means to control said inverters comprises a photosensitive switch and ambient light source means operably connected to each said inverter, said switch being exposed to ambient light and energized thereby and wherein said problem sheet is of opaque material and having open portions thereof for selectively blocking the ambient light from the said photosensitive switch.

8. A machine of claim 2 and including programmable means operably connected to the situation selector switches for selectively paralleling the logic signals to said PUG'S.

9. A machine of claim 1 wherein said annunciator means includes aligned rear-projection lamps projectable through said problem sheet at a desired point of an illustrated gate output.

10. A machine of claim 1 wherein the means to position said problem sheet to match a plurality of said situation selector switches with a plurality of illustrated logic input signal paths printed on said problem sheet comprises machine paper stops carried by the machine for intercepting two perpendicular edges of said problem sheet for alignment of said illustrated input and output signal paths with the situation selector switches.

11. A machine of claim 1 wherein the means to position said problem sheet to match a plurality of said situation selector switches with a plurality of illustrated logic input signal paths printed on said problem sheet comprises machine paper stops carried by the machine for intercepting two perpendicular edges of problem sheet and wherein each of said situation selector switches is provided with an annunciator lamp for alignment with said illustrated input and output signal paths provided on said problem sheet.

12. An independent machine for teaching binary logic utilizing a printed problem sheet having a plurality of illustrated logic input signal paths printed thereon, said machine comprising:
a. a plurality of programmable universal gates (PUG) each PUG having at least two input terminals and one output terminal;
b. annunciator means for at least one of said PUG;
c. a plurality of manually operated situation selector switches to provide logic signals to the said PUG;
d. means to position said problem sheet to match a plurality of said situation selector switches with said plurality of illustrated logic input signal paths printed on said problem sheet, and
e. a programmable sensor means to selectively interconnect the output terminal of at least one said PUG to at least one input terminal of any second PUG; and
f. an OR gate function;
g. a plurality of controllable inverter processed logic input signals to said OR gate function;
h. a controllable inverter processed logic output signal of said OR gate function;
i. programmable means to control said inverters, and
j. said annunciator means to indicate logic output condition of said controllable inverter processed logic output signal of said OR gate function; and
wherein said machine includes printed circuit contacts and wherein said programmable sensor means comprises conductive dots on said problem sheet placed in contact with said printed circuit contacts.

13. A machine of claim 12 including printed circuit contacts and wherein said conductive dots comprise carbon black ink dots on said problem sheet and are placed in contact with said printed circuit contacts.

14. A machine of claim 12 including printed circuit contacts, said printed circuit contacts including a printed circuit board, one side thereof having a plurality of spaced parallel conductive strips thereon, each said strip being connected to the output terminal of a PUG, a second plurality of parallel conductive strips secured to the opposite side of the printed circuit board and being disposed transversely to the first set of conductive strips to form a matrix therebetween, each of said second conductive strips being connected to the input terminal of a PUG, contact means provided through the board at each intersection of the first conductive strips with the second conductive strips, each said contact means being operably connected to said first conductive strips whereby upon connecting said contact means with its adjacent conducting strip of the second conducting strips by means of said conductive dots the output terminal of one PUG is operably connected to the input terminal of another PUG.

* * * * *